United States Patent [19]

Sato et al.

[11] Patent Number: 4,983,368

[45] Date of Patent: Jan. 8, 1991

[54] METHOD OF PRODUCING β-SIALON FINE POWDER

[75] Inventors: Michitaka Sato; Keiji Watanabe; Hiroaki Nishio, all of Tokyo, Japan

[73] Assignee: NKK Corporation, Tokyo, Japan

[21] Appl. No.: 455,013

[22] Filed: Dec. 22, 1989

[30] Foreign Application Priority Data

Dec. 23, 1988 [JP] Japan .................................. 63-323617

[51] Int. Cl.$^5$ ..................... C01B 33/26; C01B 21/068; C01B 33/06; C04B 35/58
[52] U.S. Cl. .................................. 423/327; 423/344; 423/385; 423/625; 423/97; 423/98
[58] Field of Search .................... 501/97, 98; 423/327, 423/344, 385, 625

[56] References Cited

U.S. PATENT DOCUMENTS 4,172,108 10/1979 Maeda .................... 501/98
4,731,236 3/1988 Murakawa et al. ............... 423/327

FOREIGN PATENT DOCUMENTS 0020239 2/1980 Japan .................................. 423/327
0118615 6/1985 Japan .................................. 423/327

OTHER PUBLICATIONS

Derwent Accession, No. 86–39 595, Questel Telesystems (WPIL), Derwent Publications, Ltd., London.

Primary Examiner—Gary P. Straub
Assistant Examiner—Lori F. Cuomo
Attorney, Agent, or Firm—Sughrue, Mion, Zinn, Macpeak & Seas

[57] ABSTRACT

A method of producing a β-sialon fine powder which comprises using a silane compound represented by the general formula of $SiH_xCl_{4-x}$ ($0 \leq x \leq 4$) as a Si source, aluminum chloride as an Al source and an ether represented by the general formula of ROR' ($R, R' = C_yH_{2y+1}$, $1 \leq y \leq 5$) as an oxygen source respectively, dissolving them in an organic solvent capable of dissolving them to obtain a solution, introducing ammonia gas into the solution to produce a precipitates, and burning the precipitates in a nonoxidative atmosphere. In the β-sialon fine powder obtained by the method of the invention, respective elements of Si, Al, O and N are uniformly distributed in a chemical viewpoint. A high density high strength sintered body can be produced even at a relatively low temperature by using the β-sialon fine powder.

9 Claims, No Drawings

METHOD OF PRODUCING β-SIALON FINE POWDER

BACKGROUND OF THE INVENTION

1. Field of the Invention

This invention relates to a method of producing β-sialon fine powder.

2. Description of the Prior Art

β-Sialon represented by the general formula of $Si_{6-z}Al_zO_zN_{8-z}$ ($0<z\leq4.2$) is a solid solution of $\beta$-$Si_3N_4$ of which the Si position is substituted with Al and the N position is substituted with O. Sintered bodies of β-sialon are excellent in strength, heat resistance, corrosion resistance and resistance to oxidation, and are utilized for cutting tools, parts of engines, parts of gas turbines and the like.

For the synthesis of β-sialon powder, various methods are known, such as pyrolyzing kaolinite occurring in nature in an ammonia gas atmosphere (Journal of Material Sceince, 11, 1972-1974, 1976), pyrolyzing a coprecipitation product of $SiO_2$ and $Al(OH)_3$ in an ammonia gas atomosphere (Am. Ceram. Soc. Bull., 58, 191-193, 1979), adding aluminum metal to a mineral such as shirasu or quartz sand and reducing the mixture in an inactive atmosphere (Yogyo Kyokai-shi, 88, 361-367, 1980), adding C to a $SiO_2$-$Al_2O_3$ mixture and burning in a nitrogen gas stream (Yogyo Kyokai-shi, 95, 570-574, 1987), and mixing amorphous $Si_3N_4$ with $Al_2O_3$, AlN and burning in a nitrogen gas stream (Japanese Patent KOKAI No. 62-72507).

Among the above methods, in the case of using natural materials such as kaolinite, shirasu and quartz sand, the synthetic powder is liable to be contaminated with impurities, while in the case of burning the coprecipitation product of $SiO_2$ and $Al(OH)_3$, the mixture of $SiO_2$-$Al_2O_3$ and the mixture of amorphous $Si_3N_4$ with $Al_2O_3$, AlN, the reaction time is long, and unreacted materials remain in the reaction product, because the reaction occurs between solid phases. Moreover, the substitution of the Si position with Al and that of the N position with O are insufficient due to the solid phase reaction, and the bending strength of the particles in the sintered body produced from the above conventional powder is also insufficient. This causes reduced strength and resistance to oxidation of the sintered body.

SUMMARY OF THE INVENTION

An object of the invention is to provide a method of producing β-sialon fine powder being highly pure wherein Si and Al, O and N are uniformly mixed at an atomic level or bound to each other.

Another object of the invention is to provide a method of producing β-sialon fine powder capable of producing a high density sintered body at a relatively low temperature.

The inventors have investigated in order to achieve the above objects, and found that a β-sialon powder where Si, Al, O, N are uniformly mixed at an atomic level can be obtained by using a silane compound represented by the general formula of $SiH_xCl_{4-x}$ ($0\leq x\leq4$) as a Si source, aluminum chloride as an Al source and an ether represented by the general formula of ROR' (R,R'=$C_yH_{2y+1}$, $1\leq y\leq5$) as an oxygen source respectively, and by dissolving them in an organic solvent capable of dissolving them to obtain a solution where Si, Al and O are uniformly mixed at an atomic level, introducing ammonia gas into the solution to produce a coprecipitation product of Si imide and Al amide, and burning the coprecipitation product in a nonoxidative atmosphere.

DETAILED DESCRIPTION OF THE INVENTION

The silane compound is represented by the general formula $SiH_xCl_{4-x}$ ($0\leq x\leq4$), and includes monosilane, dichlorosilane, trichlorosilane, tetrachlorosilane and the like. The ether is represented by the general formula ROR' where R and R' are represented by the general formula of $C_yH_{2y+1}$ ($1\leq y\leq5$) and may be identical with or different from each other. The symbol y is preferably 1 to 3. Examples of the ether are dimethyl ether and diethyl ether.

The mixing ratio of the silane compound to aluminum chloride is preferably 0.5 to 60 by the elemental ratio of Si/Al. When the ratio is less than 0.5, Al is out of the scope capable of forming a solid solution of sialon, while when the ratio is greater than 60, uniform mixing of Si with Al is difficult. The quantity of the ether is not less than 1 as molar ratio to $AlCl_3$. It is known to form a 1:1 adduct between an Al halide and an ether (Ber. disch. Chem. Ges., 75, 1055, 1942). When the quantity of the ether is less than 1, the addition reaction is insufficient, and unreacted $AlCl_3$ remains.

The organic solvent has an ability to dissolve the silane compound, aluminum chloride and the ether but does not react with them to produce a foreign material. Suitable organic solvents are dimethyl ether, benzene, nitrobenzene, carbon tetrachloroethylene, chloroform, and the like. By using the above organic solvents, it is possible to form a solution where Al and Si are uniformly dispersed.

Gaseous ammonia is introduced into the solution. The reaction with ammonia may be in a continuous system or a batch system. The pressure of the ammonia gas may be selected from the range of 0 to 10 kg/cm² as gauge pressure.

A suitable reaction temperature is different according to the raw materials employed and the like, and the range of $-30°$ C. to $50°$ C. is preferred, because the vapor pressure of the silane compound is usually high. The range of $-20°$ C. to $10°$ C. is particularly preferred. For example, when tetrachlorosilane is employed as the silane compound, it has a vapor pressure of 120 mmHg event at 10 C. A temperature higher than that is not preferable, because the silane compound is lost by evaporation during the operation resulting in changing the composition of the reaction mixture. In the case of a continuous system, the silane compound is also lost by evaporation during the reaction, while when the temperature is lower than 30 C., the reaction rate with $NH_3$ is too slow. Therefore, the reaction time becomes long, and unreacted material is liable to remain. On the other hand, $AlCl_3$ and silane compounds react with a Lewis base such as pyridine and picoline to form an adduct being stable even at ordinary temperature (J. Chem. Soc. (A), 1508, 1966, J. Am. Chem. Soc., 110, 3231-3238, 1988). In the method of the invention, it is effective to prevent the evaporation of the silane compound by forming the above adduct prior to the reaction with $NH_3$.

Also, $AlCl_3$ may be allowed to react with the ether to produce a compound where Al is uniformly mixed with O prior to the mixing with the silane compound, as shown in the following formula. The above compound and the silane compound are dissolved in a common solvent, and ammonolysis reaction is carried out similarly.

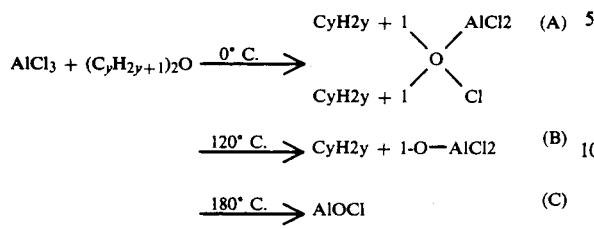

$$AlCl_3 + (C_yH_{2y+1})_2O \xrightarrow{0° C.} \begin{matrix} C_yH_{2y} + 1 \diagdown \diagup AlCl_2 \\ O \\ \diagup \diagdown \\ C_yH_{2y} + 1 \quad Cl \end{matrix} \quad (A)$$

$$\xrightarrow{120° C.} C_yH_{2y} + 1\text{-O}-AlCl_2 \quad (B)$$

$$\xrightarrow{180° C.} AlOCl \quad (C)$$

The compound mentioned above may be one of (A), (B) or (C) or a mixture of two or all of them.

The solution where the reaction with $NH_3$ is finished is composed of the coprecipitation product of Si, Al, a by-product of $NH_4Cl$ and the solvent. Then, the solvent, $NH_4Cl$, and unreacted materials are removed from the solution by a known method such as filtration, drying, sublimation or the like.

Subsequently, the coprecipitation product is burned in a nonoxidative atmosphere. The burning may be carried out at 1200° to 1600° C. in an $N_2$, $NH_3$ atmosphere. When the temperature is lower than 1200° C., the pyrolysis of the coprecipitation product is incomplete, and impurities, H and Cl remain, while when the temperature is beyond 1600° C., the pyrolysis of the product and the production of SiC occur. A part of the atmosphere may be substituted with a nonoxidative gas such as Ar or $H_2$.

The sialon powder thus obtained is fine powder having a particle size of 0.2 to 0.5 μm where Si, Al, N and O are controlled at an atomic level. The C content of the sialon powder is less than 5 wt. %, preferably less than 0.5 wt. %, and the Cl content is less than 1 wt. %, preferably less than 0.1 wt. %. When the C content or the Cl content is more than the above value, they interfere the densification or result in defects which decrease the strength of the sintered body.

A high density high strength β-sialon sintered body can be produced from the above powder by molding it in a uniaxial press, CIP or the like and then sintering at 1700° to 1800° C. in an $N_2$ gas stream.

In the method of the invention, by using the silane compound having the general formula $SiH_xCl_{4-x}$ ($0 \leq x \leq 4$), aluminum chloride, an ether having the general formula ROR' ($R,R' = C_yH_{2y+1}$, $1 \leq y \leq 5$), an uniformly mixed state can be made by dissolving them. The ether may form a 1:1 adduct with aluminum chloride in the solution. When gaseous ammonia is introduced into the solution, the ammoniation of the silane compound and the aluminum chloride-ether adduct immediately occurs to produce the coprecipitation product where silicon imide and aluminum amide are uniformly mixed at a molecular level. The β-sialon fine powder can be produced by pyrolyzing the coprecipitation product in a nonoxidative atmosphere. In the β-sialon fine powder obtained by the method of the invention, respective elements of Si, Al, O and N are uniformly distributed at an atomic level. A high density high strength sintered body can be produced even at a relatively low temperature by using the β-sialon fine powder.

EXAMPLES Example 1

14.0 cc of $SiCl_4$, 8.15 g of $AlCl_3$ (Si/Al=2.0) and 100 cc of dimethyl ether were placed in a 1 l flask having an inlet and an outlet for gas, and stirred sufficiently to form a clear solution where all of them were completely dissolved. The flask was kept at −10° C. in a thermostat, and $NH_3$ gas was introduced into the flask for 2 hours at a rate of 2 l/min by opening both of the inlet cock and the outlet cock. White precipitates were produced in the flask. The precipitates were collected by filtration using a filter paper, and placed in a closed vessel having an evacuation line. Then, the precipitates were dryed by heating on a hot plate, while the closed vessel was evacuated. All of the above operations were carried out in a glove box kept at a moisture concentration of less than 1 ppm and a oxygen concentration of less than 1 ppm.

The above precipitates was placed in a platinum crucible and put into a tube furnace. $N_2$ gas was flown in the furnace at 1 l/min, and the temperature was elevated at 10° C./min to 350° C. Then, the temperature was kept for 1 hour to remove a by-product of $NH_4Cl$. The temperature was elevated again from 350° C. to 1450° C. at a rate of 5° C./min, and kept for 2 hours.

The powder thus obtained was white, and found to be composed of equilateral fine particles of 0.2 to 0.5 μm by using a transmission electron microscope (TEM). As a result of X-ray diffraction analysis, the powder was a single phase of β-sialon, and the Z value estimated by the values of the a-axis and c-axis was about 1.9. It was confirmed by energy-dispersive element analysis (EDS) that Si and Al were uniformly dispersed. The carbon content of the powder measured by wet anlaysis was 0.2 wt. %, and the Cl content was 0.1 wt. %.

Example 2

Similar to Example 1, 13.7 cc of $SiCl_4$, 8.0 g of $AlCl_2$ (Si/Al=2.0) and 100 cc of dimethyl ether were placed in a 1 l flask, and 200 cc of pyridine was added to produce white precipitates immediately. The flask was kept at 0° C. in a thermostat, and the mixture was allowed to react for 2 hours by introducing $NH_3$ gas at a rate of 2 l/min. The past operations were carried out in the same manner as Example 1.

The powder obtained was analyzed by X-ray diffraction analysis, TEM and EDS, and found to be composed of β' phase containing about 15 wt. % of O' phase. The Z value was about 2.0, and Si and Al were uniformly dispersed. The particle size was 0.3 to 0.6 μm.

To 50 g of the above powder, 300 cc of ethanol and 1.5 wt. % of PVA as a molding assistant were added, and the solvent was evaporated in a rotary evaporator with suction to form granules. The granules were pressed by an uniaxial press in a mold having an inside diameter of 20 mmφ, and then subjected to CIP at 3 t/cm² to obtain a molded body. The molded body was dewaxed at 500° C. in nitrogen gas, and sintered in a carbon crucible at 1750° C. in a nitrogen gas stream of 1 atm for 2 hours. The density of the sintered body was 3.10 corresponding to 99.7 % of the theoretical density being 3.11. As a result of X-ray diffraction analysis, the sintered body was composed of β phase containing about 10 wt. % of O' phase, and the Z value was about 2.0 which maintains the powder composition.

Example 3

15.0 cc of $SiCl_4$, 1.59 g of $AlCl_3$ and 100 cc of dimethyl ether were placed in a pressure vessel made of tantalum having an inlet and an outlet for gas, an evacuation line and a stirrer, and stirred well. The vessel was kept at −5° C. in a thermostat, and ammonia gas was introduced for 3 hours into the vessel of which the outlet cock was closed so that the pressure was kept at 2 kg/cm². After the reaction, the gas in the vessel was replaced by N₂ gas, and the solvent was removed at 30° C. in vacuo. The powder produced was placed in an alumina crucible, and NH₄Cl was removed by heating at 350° C. for 1 hour in a horizontal tube furnace. Then, the powder was placed in an urethane pot, and ball milled by Si₃N₄ balls after acetone was added. After drying, the powder was placed in a platinum crucible, and heated at 1400° C. for 3 hours in a NH₃ gas stream of 1 1/min in a tube furance.

The powder thus obtained was β-sialon powder having a particle size of 0.2 to 0.4 μm, and the Z value was about 0 5. The carbon remaining in the powder was 1.2 wt. %.

Example 4

8.0 g of AlCl₃ was placed in a beaker, and dissolved by adding 100 cc of dimethyl ether. The solution was heated, and light yellowish porous matter was produced at about 170° C. The porous matter was lightly ground in a mortar, and dissolved in 50 cc of nitromethane in a beaker. When 14.1 cc of SiCl₄ was added, the mixture was separated into two phases. By adding 100 cc of benzene, the mixture was returned to one phase. Then, the solution was placed in a 1 l flask, and allowed to react for 2 hours by introducing NH₃ gas at a rate of 2 l/min in the same manner as Example 1. The produced precipitates were treated similarly to obtain white powder.

As a result of X-ray analysis, the powder was composed of β phase containing 5 wt. % of 0′ phase, and the Z value was estimated to be 2.1. The particle size was 0.2 to 0.5 μm.

We claim:

1. A method of producing a β-sialon powder which comprises using a silane compound represented by the general formula of $SiH_xCl_{4-x}$ ($0 \leq x \leq 4$) as a Si source, AlCl₃ as an Al source and an ether represented by the general formula of ROR' ($R,R'=C_yH_{2y+1}$, $1 \leq y \leq 5$) as an oxygen source respectively, dissolving them in an organic solvent capable of dissolving them to obtain a solution, introducing ammonia gas into the solution to produce coprecipitate, and burning the coprecipitate in a nonoxidative atmosphere.

2. The method of claim 1 wherein the molar ratio of the ether to the AlCl₃ is more than 1.

3. The method of claim 1 wherein the reaction temperature with the ammonia gas in −30° to 50° C.

4. The method of claim 1 wherein the burning temperature is 1200° to 1600° C.

5. The method of claim 1, claim 2, claim 3 or claim 4 wherein the AlCl₃ is allowed to react with the ether to produce AlOCl,

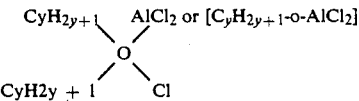

or a mixture of two or more of said compounds produced, whereafter the compound or two or more of said compounds produced and the silane compound is or are dissolved in the solvent.

6. The method of claim 1, claim 2, claim 3 or claim 4, wherein the mixing ratio of the silane compound to the AlCl₃ is 0.5 to 60 by elemental ratio of Si/Al.

7. The method of claim 1, wherein the sialon powder has a particle size of 0.2 to 0.5 μm.

8. The method of claim 1, wherein the introducing of ammonia gas results in a coprecipitation product of Si imide and Al imide.

9. The method of claim 1, wherein the ether forms a 1:1 adduct with the AlCl₃.

* * * * *